(12) United States Patent
Wildrick et al.

(10) Patent No.: US 11,942,865 B2
(45) Date of Patent: Mar. 26, 2024

(54) NON-ISOLATED POWER MODULE WITH USER ADJUSTABLE PASS-THROUGH MODE

(71) Applicant: TDK-Lambda Americas, Inc., Richardson, TX (US)

(72) Inventors: Carl Wildrick, Parker, TX (US); Joel Zaens, Plano, TX (US)

(73) Assignee: TDK-Lambda Americas Inc., Richardson, TX (US)

( * ) Notice: Subject to any disclaimer, the term of this patent is extended or adjusted under 35 U.S.C. 154(b) by 0 days.

(21) Appl. No.: 17/244,743

(22) Filed: Apr. 29, 2021

(65) Prior Publication Data
US 2022/0352821 A1 Nov. 3, 2022

(51) Int. Cl.
*H02M 3/158* (2006.01)
*H02M 1/00* (2006.01)

(52) U.S. Cl.
CPC ....... *H02M 3/1582* (2013.01); *H02M 1/0025* (2021.05)

(58) Field of Classification Search
CPC .................................................. H02M 3/1582
See application file for complete search history.

(56) References Cited

U.S. PATENT DOCUMENTS 7,786,709 B2 * 8/2010 Lawson ............... H02M 3/1582
363/63
10,135,340 B1 11/2018 Megaw
10,686,381 B1 6/2020 Zhang et al.
2005/0035747 A1 * 2/2005 Mullett ............... H02M 3/1582
323/285
2012/0049819 A1 * 3/2012 Mao ........................ H02J 1/001
323/234

(Continued)

OTHER PUBLICATIONS

Harles E. Mullett, "Bimodal DC-DC Converter With an Efficient Pass-Through Zone"; Published in Twentieth Annual IEEE Applied Power Electronics Conference and Exposition, 2005. APEC 2005; ISBN 0-7803-8975-1, ISSN: 1048-2334; URL: https://ieeexplore.ieee.org/stamp/stamp.jsp?tp=&arnumber=1453114&isnumber=31030.

(Continued)

*Primary Examiner* — Peter M Novak
(74) *Attorney, Agent, or Firm* — Stephen Y. Liu; David W. Carstens; Carstens, Allen & Gourley, LLP (57) ABSTRACT

A power converter with a voltage-modulating circuit, a controller, and a sensing circuit. The controller controls switches of a voltage-modulating circuit to provide a level of an output voltage (VOUT) based on an operational mode of the voltage-modulating circuit and a voltage measurement provided by the sensing circuit. The operational mode of the voltage-modulating circuit can be pass-through mode or voltage-modulating. The sensing circuit includes one or more externally programmable connectors configured to determine one or more boundaries of an output voltage window. In the pass-through mode, a level of VOUT will be provided without switching any of the switches when a level of an input voltage (VIN) falls within the output voltage window. In the voltage-modulating mode, a level of VOUT will be provided by switching one or more of the switches when the level of VIN falls outside of the output voltage window having only one boundary.

20 Claims, 7 Drawing Sheets

(56) References Cited

U.S. PATENT DOCUMENTS

2021/0203231 A1* 7/2021 Lula ................... H02M 1/0032
2022/0200452 A1* 6/2022 Koki ................... H02M 3/158

OTHER PUBLICATIONS

David Megaw, et al., "4-Switch Buck-Boost Controller with Pass-Thru Capability Eliminates Switching Noise"; Analog Devices; https://www.analog.com/en/design-notes/4-switch-buck-boost-controller-with-pass-thru-capability-eliminates-switching-noise.html.

* cited by examiner

NON-ISOLATED POWER MODULE WITH USER ADJUSTABLE PASS-THROUGH MODE

BACKGROUND

Technical Field

Novel aspects of the present disclosure relate to power converters, and more particularly, to an improved power converter with a high-efficiency pass-through mode.

Background

Power converters are devices that convert an input voltage to a different voltage. For example, a DC-DC converter converts a direct current input voltage to a different direct current output voltage. When the desired output voltage is higher than the input voltage, then the DC-DC converter is a colloquially termed a "boost converter" or "step-up" converter. An example of a conventional boost converter circuit is provided in FIG. 2. A DC-DC converter that provides a desired output voltage that is lower than the input voltage is sometimes referred to as a "buck converter" or "step-down" converter. An example of a conventional buck converter is provided in FIG. 1. In other embodiments, the diodes of the boost converter and buck converter can be replaced by switches used for synchronous rectification, as shown and discussed in more detail in FIGS. 3 and 4.

Figure 3:
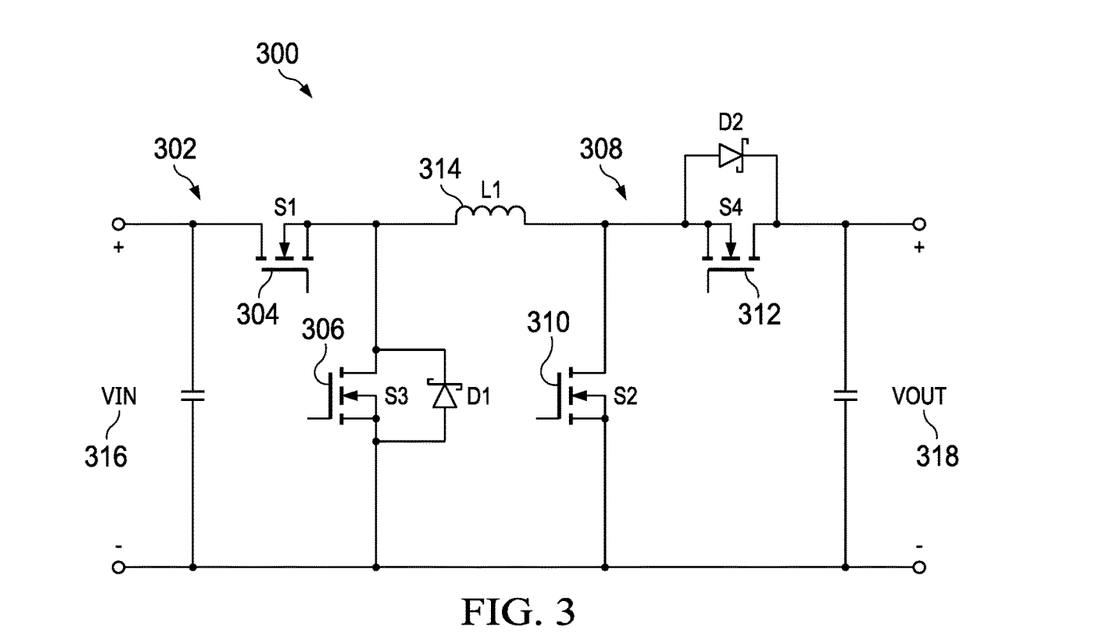
FIG. 3 is a schematic diagram of a conventional buck-boost converter circuit.
Figure 4:
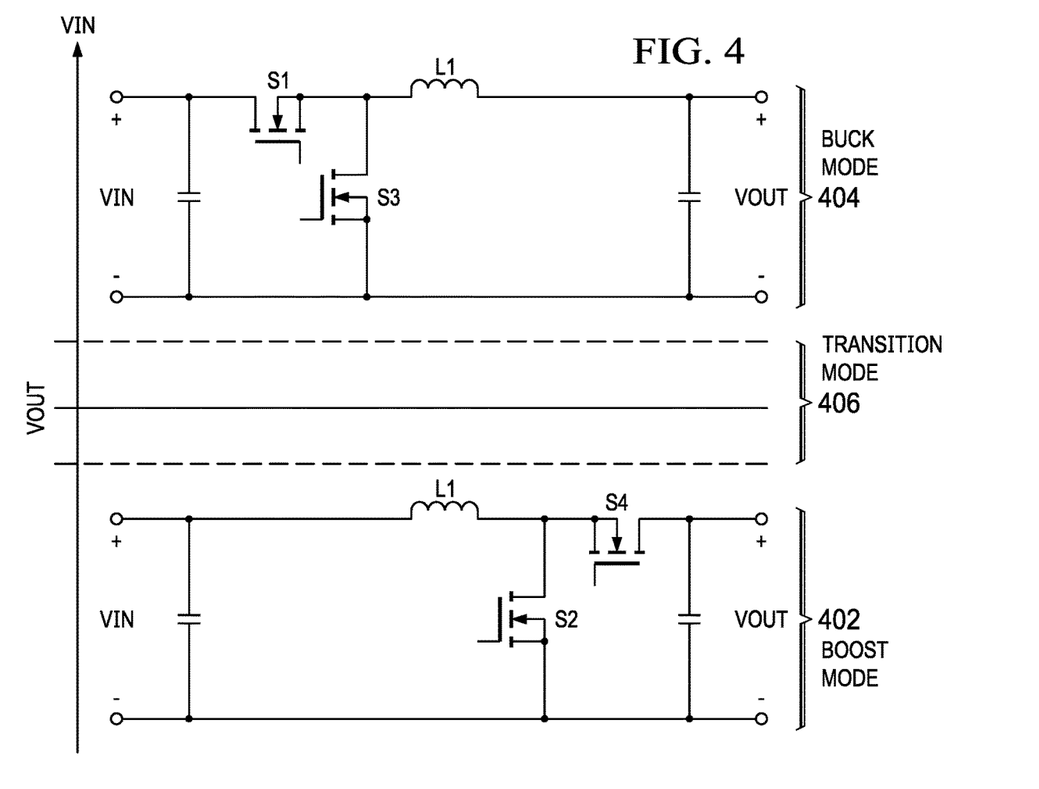
FIG. 4 is a diagram depicting the various operational modes of a conventional buck-boost converter.

Boost converters and buck converters can be combined to form a buck-boost converter for controlling an output voltage. An exemplary buck-boost converter is depicted in FIG. 3. When the desired level of the output voltage is within a range that is close to the level of the input voltage, the buck-boost converter enters a transition mode in which both the buck circuit and the boost circuit are active to control the level of the output voltage, as shown in FIG. 4 and discussed in more detail below. The buck circuit drops the level of the output voltage down to prevent the level of the output voltage from getting too high, which causes the boost circuit to increase the level of the output voltage to prevent the output voltage from getting too low. This cycle repeats with the components working in conjunction to keep the level of the output voltage at a desired level.

SUMMARY OF THE INVENTION

Novel aspects of the present invention are directed to a power converter that includes a voltage-modulating circuit that comprises one or more switches, the voltage-modulating circuit configured to receive an input voltage and provide an output voltage. The power converter also includes a controller coupled to the voltage-modulating circuit. The controller is configured to selectively drive the one or more switches to control a level of the output voltage based on the operational mode of the voltage-modulating circuit. The power converter also includes a sensing circuit connected to the voltage-modulating circuit and the controller. The sensing circuit comprises one or more externally programmable connectors configured to determine one or more boundaries of an output voltage window for operating the voltage-modulating circuit. When the operational mode of the voltage-modulating circuit is a pass-through mode and a voltage measurement indicates that a level of the input voltage is within the output voltage window having an upper boundary and a lower boundary, the voltage-modulating circuit is configured to control the level of the output voltage to correspond with the level of the input voltage without switching the one or more switches. When the operational mode of the voltage-modulating circuit is in a voltage-modulating mode and the voltage measurement indicates that the level of the input voltage is outside of the output voltage window having only one boundary, the voltage-modulating circuit is configured to control the level of the output voltage to differ from the level of the input voltage by switching the one or more switches.

In another embodiment, novel aspects of the present invention are directed to an apparatus that includes a current-drawing load configured to receive an output voltage, the current-drawing load connected to a power converter that includes a voltage-modulating circuit that comprises one or more switches. The voltage-modulating circuit is configured to receive an input voltage and provide the output voltage to the current-drawing load. The power converter also includes a controller coupled to the voltage-modulating circuit. The controller is configured to selectively drive the one or more switches to control a level of the output voltage based on the operational mode of the voltage-modulating circuit. The power converter also includes a sensing circuit connected to the voltage-modulating circuit and the controller. The sensing circuit comprises one or more externally programmable connectors configured to determine one or more boundaries of an output voltage window for operating the voltage-modulating circuit. When the operational mode of the voltage-modulating circuit is a pass-through mode and a voltage measurement indicates that a level of the input voltage is within the output voltage window, having an upper boundary and a lower boundary, the voltage-modulating circuit is configured to control the level of the output voltage to correspond with the level of the input voltage without switching the one or more switches. When the operational mode of the voltage-modulating circuit is in a voltage-modulating mode and the voltage measurement indicates that the level of the input voltage is outside of the output voltage window having only one boundary, the voltage-modulating circuit is configured to control the level of the output voltage to differ from the level of the input voltage by switching the one or more switches.

In yet another embodiment, novel aspects of the present invention are directed to a method for operating a power convener that can operate in a novel pass-through mode, the power converter including a voltage-modulating circuit configured to receive an input voltage and provide an output voltage, a sensing circuit configured to measure a voltage of the voltage-modulating circuit, and a controller configured to selectively drive one or more switches of the voltage-modulating circuit based on the voltage measurement. The method includes the steps of determining, by the controller, an operational mode of the voltage-modulating circuit; receiving, by one or more externally programmable connectors of the sensing circuit, a selection of one or more boundaries for an output voltage window for operating the voltage-modulating circuit; and obtaining, with the sensing circuit, the voltage measurement. Responsive to determining that the operational mode of the voltage-modulating circuit is a pass-through mode and the voltage measurement indicates that a level of the input voltage is within the output voltage window having an upper boundary and a lower boundary, controlling, with the controller, a level of the output voltage to correspond with a level of the input voltage without switching the one or more switches; and responsive to determining that the operational mode of the voltage-modulating circuit is a voltage-modulating mode and the voltage measurement indicates that the level of the input voltage is outside the output voltage window having only one boundary, controlling, with the controller, the level of the output voltage to differ from the level of the input voltage by switching the one or more switches.

Other aspects, embodiments, and features of the invention will become apparent from the following detailed description of the invention when considered in conjunction with the accompanying FIGURES. In the FIGURES, each identical, or substantially similar component that is illustrated in various FIGURES is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE FIGURES

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying FIGURES, wherein:

DETAILED DESCRIPTION

Figure 1:
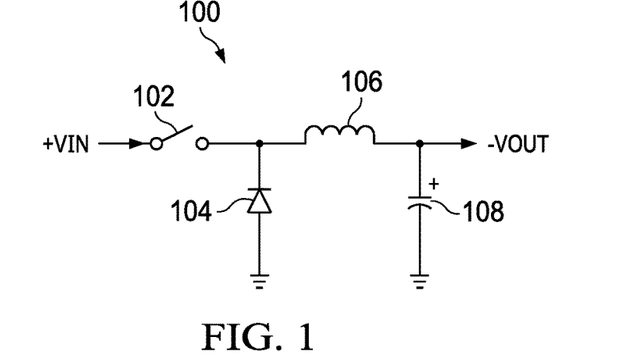
FIG. 1 is a schematic diagram of a conventional buck converter circuit.
Figure 2:
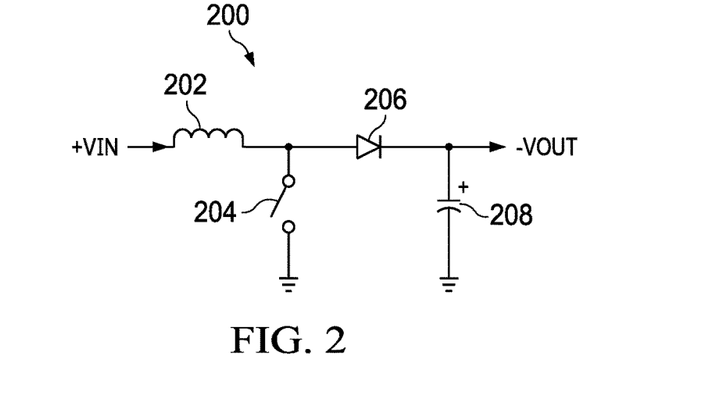
FIG. 2 is a schematic diagram of a conventional boost converter circuit.

For a more thorough understanding of the novel aspects of the present disclosure, a brief discussion of conventional buck-boost converters will be presented with particular reference to FIGS. 1-3.

FIG. 1 is a schematic diagram of a conventional buck converter circuit. The buck converter circuit 100 is formed from a switch 102, a diode 104, an inductor 106, and a capacitor 108. In some embodiments, the diode 104 can be replaced by a switch, such as switch S3, as shown in the buck converter circuit of FIG. 4 below. The buck converter circuit 100 is configured to step an input voltage (VIN) down so that the level of the output voltage (VOUT) is lower than the level of VIN.

FIG. 2 is a schematic diagram of a conventional boost converter circuit. The boost converter circuit 200 is formed from an inductor 202, switch 204, and diode 206 and 208. In some embodiments, the diode 206 can be replaced by a switch, such as switch S2, as shown in the boost converter circuit of FIG. 4 below. The boost converter circuit 200 is configured to step VIN up so that the level of VOUT is higher the level of VIN.

FIG. 3 is a schematic diagram of a conventional buck-boost converter circuit. The buck-boost converter circuit 300, which may be referred to more generally as a voltage-modulating circuit, can be formed by joining the buck converter circuit 100 of FIG. 1 with the boost converter circuit 200 of FIG. 2 and arranged so that the inductor is shared.

The exemplary buck-boost converter circuit 300 in FIG. 3 is formed from a buck circuit 302 that includes a first pair of switches S1 304 and S3 306 and a boost circuit 308 that includes a second pair of switches S2 310 and S4 312. The first pair of switches S1 304 and S3 312 is connected to the second pair of switches S2 310 and S4 312 by a shared inductor 314. The buck-boost converter circuit 300 steps VIN 316 down by operation of the buck circuit 302, i.e., by operation of switch S1 304 as a control switch, operation of switch S3 312 as a synchronous rectifier, and by holding switch S4 312 in an ALWAYS ON condition. Operation of the buck circuit 302 of buck-boost converter circuit 300 results in VOUT 318 that is at a level less than the level of VIN 316. The buck-boost converter circuit 300 steps VIN 316 up by operation of the boost circuit 308, i.e., by operation of the switch S2 310 as a control switch, operation of switch S4 312 as a synchronous rectifier, and by holding switch S1 304 in an ALWAYS ON condition. Operation of the boost circuit 308 of buck-boost converter circuit 300 results in VOUT 318 that is at a level greater than the level of VIN 316.

FIG. 4 is a diagram depicting the various operational modes of a conventional buck-boost converter that is configured with a desired VOUT at a level depicted by the solid line between two dotted lines. When the level of VOUT is too low, the buck-boost converter circuit 300 operates in a boost mode 402 and the boost circuit steps up VIN to increase a level of VOUT. When the level of VOUT is too high, the voltage-modulating circuit 300 operates in buck mode 404 and steps down VIN to decrease the level of VOUT. When the level of VOUT is within a range close to the level of VIN, e.g., within about ±5 V in this example in FIG. 4, then the voltage-modulating circuit 300 operates in a transition mode 406. In other embodiments, the range of VOUT that is close to the level of VIN can be determined by percentages, e.g., +/−10% of VIN or +/−15% of VIN.

In the transition mode, the buck circuit 302 and the boost circuit 308 operate in alternating fashion to step up and step-down VIN when the level of VOUT is maintained within the range close to the level of VIN. While the operation of a conventional buck-boost converter can produce the desired level of VOUT, the continual operation of both the boost circuit 308 and buck circuit 302 during the transition mode 406 results in power losses and inefficiencies. An example of the efficiencies of the buck-boost converter circuit 300 in each of the various operating modes is discussed in more detail in the figure that follows.

Figure 5:
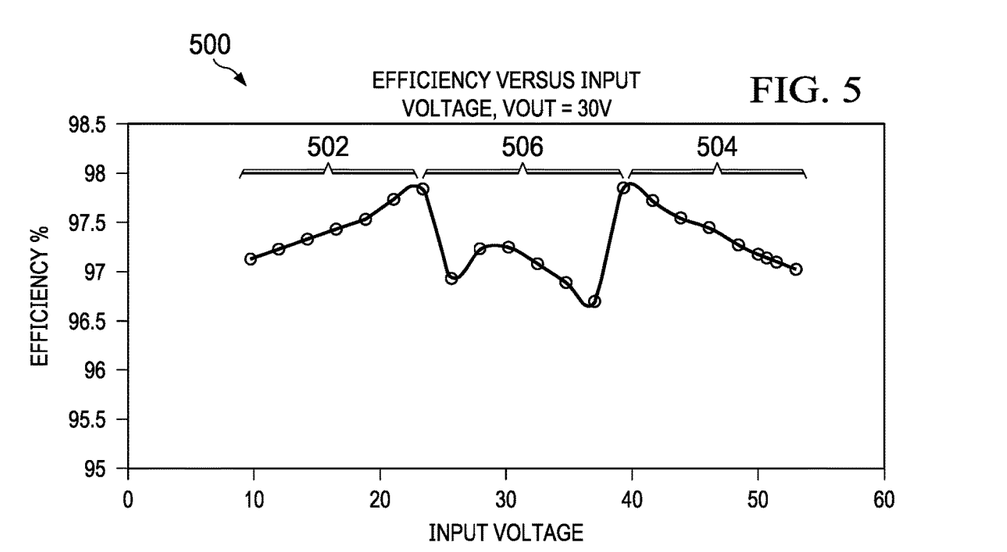
FIG. 5 is an exemplary waveform illustrating the efficiency of a conventional buck-boost converter.

FIG. 5 is an exemplary waveform illustrating the efficiency of a conventional buck-boost converter. In particular, the waveform 500 depicts the efficiency of buck-boost converter circuit 300 as a function of input voltage (V) when the buck-boost converter is configured with a desired output voltage at 30 V. In the Boost Region 502, which corresponds to Boost Mode 402 in FIG. 4, the efficiency increases as the level of VOUT approaches the desired level of the VOUT. As the buck-boost converter circuit 300 enters the Transition Region 506, which corresponds to the Transition Mode 406 in FIG. 4, the efficiency is depressed around the desired output voltage VOUT=30 V. As the buck-boost converter circuit 300 enters the Buck Region 504, which corresponds to Buck Mode 404 in FIG. 4, the efficiency exhibits a sharp increase, followed by a steady decline.

In many practical applications, the buck-boost converter circuit 300 is only required to operate for short, transient time intervals because the input power supply's operating point may be close enough to the output load's voltage requirement such that a power converter is unnecessary except during the transient intervals. In these cases, the level of VIN and VOUT are close enough that the buck-boost converter circuit 300 is operating in the transition mode for the majority of its operating life, resulting in higher cost and lower efficiency and lower reliability. Accordingly, novel aspects of this present disclosure are directed to an improved voltage-modulating circuit configured with a pass-through mode during the transition mode, which reduces power loss and cost, and increases reliability and efficiency during the majority of its operating life. When the voltage-modulating circuit is operating in the pass-through mode, the level of VIN and VOUT are approximately equal and level of VOUT is not regulated by a switching converter, i.e., in the absence of switching.

Other novel aspects of the present disclosure provide the ability for customers to customize a power converter that is specific to the customer's desired application. Power modules are conventionally designed for the general market because they are employed in a broad array of applications and with numerous load types. However, some loads, such as field-programmable gate arrays (FPGAs), require extremely tight control of the power module's output voltage so that operation in pass-through mode is impractical. Other loads, such as downstream point-of-load converters, may be able to accommodate a wider voltage tolerance and can run almost exclusively in pass-through mode. Other load types may benefit from running in pass-through mode, but over a particular fixed range. Thus, the provision of a power module with customizable fixed-range pass-through mode as described in the various embodiments disclosed herein, allows designers to provide power converters that adequately address the various use cases without the need for carrying a large lineup of power converter modules.

While a conventional buck-boost converter can provide a desired level of the output voltage, both the boost converter circuit and the buck converter circuit experience power losses by their constant switching. A pass-through mode, as described in one or more embodiments of the novel voltage-modulating device of the present disclosure, increases efficiency and decreases power losses by refraining from the constant switching during the transition mode. Before a detailed discussion of the improved voltage-modulating device, a brief discussion of conventional buck voltage regulators and boost voltage regulators, which utilize buck voltage circuits and boost voltage circuits, respectively, will be provided for some helpful context.

Figure 6:
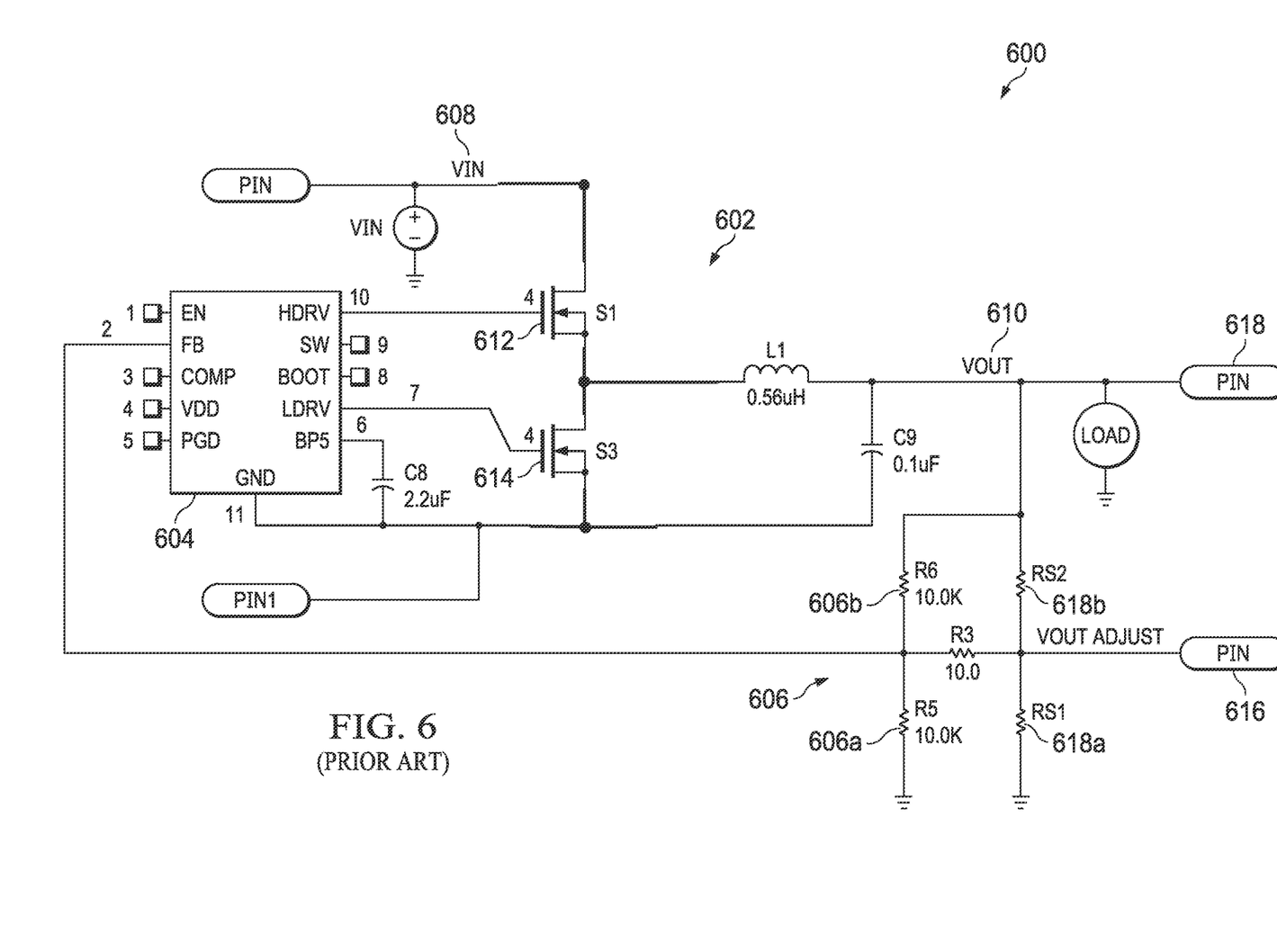
FIG. 6 is a simplified schematic diagram of a conventional buck voltage regulator.

FIG. 6 is a simplified schematic diagram of a conventional buck voltage regulator. The buck voltage regulator 600, also referred to in the alternative as a buck converter, includes a buck circuit 602 connected to a controller 604 and a sensing circuit 606. In this illustrative embodiment, the sensing circuit 606 is implemented as a voltage divider formed from resistor R5 606a and resistor R6 606b.

The controller 604 controls operation of the set of switches S1 612 and S3 614 to provide a level of VOUT 610 based on a level of VIN 608. For example, the controller 604 detects a level of VOUT 610 through sensing circuit 606 and then adjusts the duty cycle of switches S1 612 and S3 614 to maintain the desired level of VOUT 610. In one embodiment, the level of VOUT 610 can be set by injecting current into the VOUT adjust pin 616 or by drawing current from the VOUT adjust pin 616. Adjustment of the setpoint of the buck converter 600 can be achieved by a resistor strap RS1 618a added between the VOUT adjust pin 616 and ground or by a resistor strap RS2 618b between the VOUT adjust pin 616 and VOUT pin 618.

The buck converter 600 decreases the level of VOUT 610. If the sensing circuit 606 is configured with an output voltage setpoint that is higher than the level of VIN 608, then the control loop will saturate and controller 604 attempts to turn switch S1 612 ON continuously until the level of VOUT 610 has dropped below the output voltage setpoint of the sensing circuit 606. Conventional buck voltage regulator 600 is often incapable of turning S1 612 ON with a 100% duty cycle, which is needed for a pass-through mode of operation.

Figure 7:
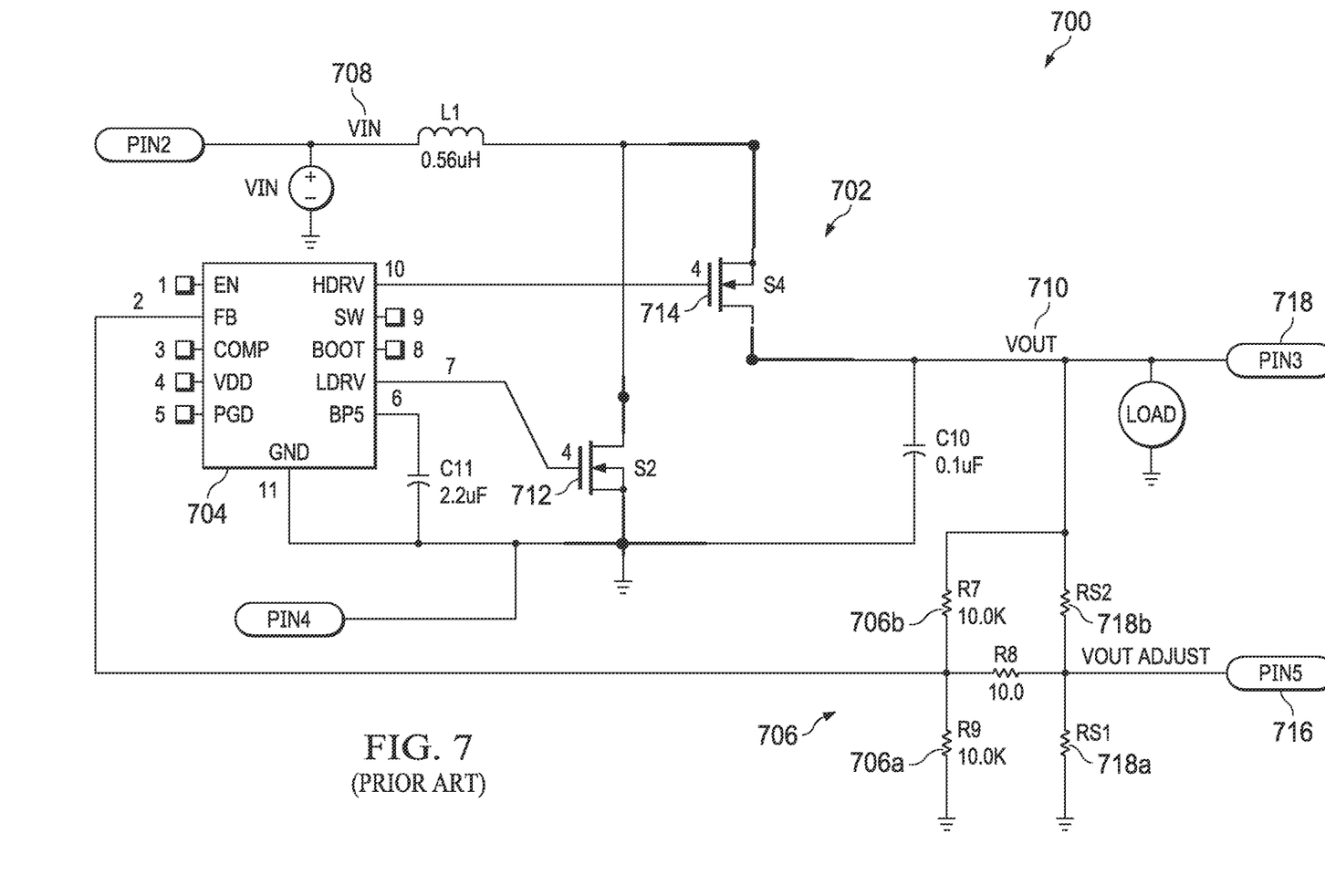
FIG. 7 is a simplified schematic diagram of a conventional boost voltage regulator.

FIG. 7 is a simplified schematic diagram of a conventional boost voltage regulator. The boost voltage regulator 700, also referred to in the alternative as a boost converter, includes a boost circuit 702 connected to a controller 704 and a sensing circuit 706. In this illustrative embodiment, the sensing circuit 706 is implemented as a voltage divider formed from resistor R9 706a and resistor R7 706b.

The controller 704 controls operation of the set of switches S2 712 and S4 714 to provide a level of VOUT 710 based on a level of VIN 708. For example, the controller 704 detects a level of VOUT 710 through sensing circuit 706 and then adjusts the duty cycle of switches S2 712 and S4 714 to maintain the desired level of VOUT 710. In one embodiment, the level of VOUT 710 can be set by injecting current into the VOUT adjust pin 716 or by drawing current from the VOUT adjust pin 716. Adjustment of the level of VOUT 710 can be achieved by a resistor strap RS1 718a added between the VOUT adjust pin 716 and ground or by a resistor strap RS2 718b between the VOUT adjust pin 716 and VOUT pin 718.

The boost converter 700 increases a level of VOUT 710. If the sensing circuit 706 is configured with an output voltage setpoint that is lower than the level of VIN 708, the control loop will saturate and the controller 704 attempts to turn switch S4 714 ON continuously until the level of VOUT 710 has risen above the output voltage setpoint of the sensing circuit 706. Conventional boost voltage regulator 700 is often incapable of turning S4 714 ON with a 100% duty cycle, which is needed for a pass-through mode of operation.

Figure 8:
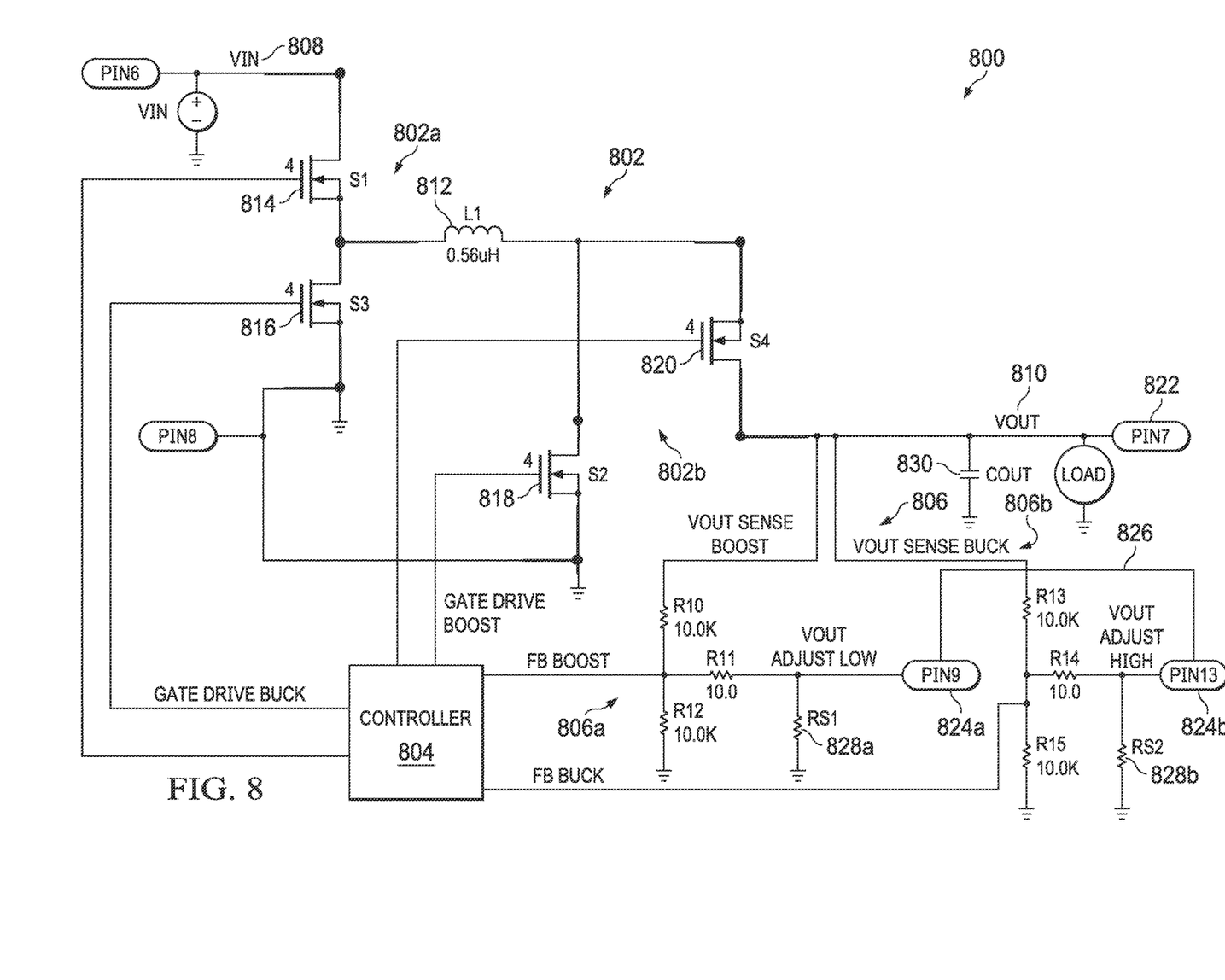
FIG. 8 is a schematic diagram of an improved power converter including a voltage-modulating circuit with a pass-through mode in accordance with an illustrative embodiment.

FIG. 8 is a schematic diagram of an improved power converter including a voltage-modulating circuit with a pass-through mode in accordance with an illustrative embodiment. The pass-through mode of the exemplary power converter 800 is established with analog programming.

Power converter 800 includes a voltage-modulating circuit 802 connected to a controller 804 and a sensing circuit 806. Generally, the voltage-modulating circuit 802, which is depicted as a buck-boost converter circuit in this non-limiting example, receives VIN 808 and the controller 804 controls the operation of the voltage-modulating circuit 802 to provide VOUT 810 at a level that is based on a voltage measurement provided by the sensing circuit 806 and an operating mode defined by a configuration of the sensing circuit 806. In one embodiment, the voltage measurement is of VOUT 810 and the operational mode is one of pass-through mode or a voltage-modulating mode. The sensing circuit 806 is also configured to set the boundaries of the output voltage window that determines the voltage bandwidth of the transition mode when the voltage-modulating circuit 802 is operating in the pass-through mode.

In this illustrative example, the voltage-modulating circuit 802 is generally formed from a buck converter circuit 802a connected to a boost converter circuit 802b by a shared inductor L1 812, e.g., a first pair of switches S1 814 and S3 816 connected to a second set of switches S2 818 and S4 820 by a shared inductor 812. The controller 804 is configured to selectively drive one or more of the set of switches S1 814, switch S2 818, switch S3 816, and switch S4 820 to control a level of VOUT 810 based in part on an operational mode of the voltage-modulating circuit 802. As used herein, the "a set" means one or more. Thus, a set of switches can mean one switch or two or more switches.

The sensing circuit 806 includes a boost voltage sensing circuit 806a and buck voltage sensing circuit 806b coupled to the output pin PIN7 822 to measure the level of VOUT 810. The sensing circuit 806 also includes a set of externally programmable connectors 824 that can be accessed and utilized by a user without the need to physically contact the internal circuitry of the power converter 800 or the electronic device in which the power converter 800 is utilized. For example, in one embodiment the set of externally programmable connectors includes two connectors, each of which can receive a circuit element, such as a resistor or wire, without the need to directly contact or modify the internal circuitry.

In this example in FIG. 8, the externally programmable connectors 824 includes a first adjustment pin PIN9 824a and a second adjustment pin PIN13 824b configured to engage a circuit element. A configuration of the sensing circuit 806, and more specifically a configuration of the externally programmable connectors 824, determines an operating mode of the voltage-modulating circuit 802. In one embodiment, the operating mode of the voltage-modulating circuit 802 is the pass-through mode based on an absence of an electrical connection 826 between the first adjustment pin 824a and the second adjustment pin 824b, and the operating mode of the voltage-modulating circuit 802 is the voltage-modulating mode based on a presence of the electrical connection 826 between the first adjustment pin 824a and the second adjustment pin 824b. For example, the electrical connection 826 can be a wire that an end-user can place between the first adjustment pin 824a and the second adjustment pin 824b to cause the voltage-modulating circuit 802 to operate in the voltage-modulating mode. When operating in the voltage-modulating mode, the power converter 800 operates in a manner consistent with conventional buck-boost converters.

In the absence of the electrical connection 826 between the first adjustment pin 824a and the second adjustment pin 824b, the voltage-modulating circuit 802 is configured to operate in a pass-through mode based on the size of the output voltage window determined by the programmable circuit elements connected to the first adjustment pin 824a and the second adjustment pin 824b. For example, in one embodiment, the first adjustment pin 824a is configured to receive a resistor strap RS1 828a having a first resistance to set the first boundary of the output voltage window and the second adjustment pin 824b configured to receive a resistor strap RS2 828b having a second resistance. In an embodiment where the resistance of R10=R13, R12=R15, and R11=R14, and where the first resistance of RS1 828a differs from the second resistance of RS2 828b, then a voltage window is formed with boundaries based on the differences in the first resistance and the second resistance. In other embodiments where the boost sensing circuit 806a is dissimilar from the buck sensing circuit 806b, skilled artisans would know how programmable circuit elements coupled with the adjustment pins 824 could be used to create setpoints, i.e., boundaries, which define the size the output voltage window.

While operating in pass-through mode, VIN 808 rises from 0V to the under voltage lockout threshold where the power converter 800 becomes energized. The controller 804 receives voltage measurements from the buck voltage sensing circuit 806b indicating that VOUT 810 is too low, causing controller 804 to turn switch S1 814 ON, i.e., at 100% duty cycle, while leaving switch S3 816 OFF, i.e., at a 0% duty cycle. The controller 804 also receives voltage measurements from the boost voltage sensing circuit 806a indicating that VOUT 810 is too low, which causes controller 804 to begin switching switches S2 818 and S4 820 with an appropriate duty cycle, i.e., greater than 0% and less than 100%, to achieve the desired level of VOUT 810 commanded by the feedback from the boost voltage sensing circuit 806a.

As a level of VIN 808 continues to rise past the lower boundary of the output voltage window, i.e., the setpoint of the boost converter circuit, the voltage-modulating circuit 802 enters into the transition mode. The controller 804 receives a voltage measurement from the boost voltage sensing circuit 806a indicating that a level of VOUT 810 is too high, which causes the controller 804 to switch S2 818 OFF and switch S4 820 ON, i.e., to cause the boost converter circuit to enter a zero-duty cycle mode. The controller 804 also receives a voltage measurement from the buck voltage sensing circuit 806b indicating that the level of VOUT 810 is still too low, causing the controller 804 to maintain S1 814 ON while leaving switch S3 816 OFF. While the level of VIN 808 is between the lower boundary and the upper boundary of the output voltage window, i.e., the setpoint of the buck converter circuit, the voltage-modulating circuit 802 remains in the transition mode, causing the power converter 800 to operate in the pass-through mode. Thus, when operating in a pass-through mode, switches S1 814 and S4 820 are held ON, i.e., 100% duty cycle, while switches S2 818 and S3 816 are held OFF, i.e., 0% duty cycle. In pass-through mode, there is no switching of switches S1 814, S2 818, S3 816, and S4 820 so all switching losses are conserved and the switching ripple currents are eliminated. Instead of being a switching power converter, VIN 808 is connected to the output PIN7 822 through a low pass noise filter formed by L1 812 and capacitor COUT 830, creating a reduced noise operating state. The losses in the circuit become minimal-mainly from the conduction losses in switch S1 814, S4 820, and inductor L1 812.

Thus, when the operational mode of the voltage-modulating circuit 802 is a pass-through mode and a voltage measurement indicates that a level of VIN 808 is within the output voltage window having an upper boundary and a lower boundary, the voltage-modulating circuit 802 is configured to control the level of VOUT 810 to correspond with the level of VIN 808 without switching the one or more switches S1 814, S2 818, S3 816, and S4 820. When the operational mode of the voltage-modulating circuit 802 is in a voltage-modulating mode and the voltage measurement indicates that the level of VIN 808 is outside of the output voltage window having only one boundary, the voltage-modulating circuit 802 is configured to control the level of VOUT 810 to differ from the level of VIN 808 by switching the one or more switches S1 814, S2 818, S3 816, and S4 820.

Figure 9:
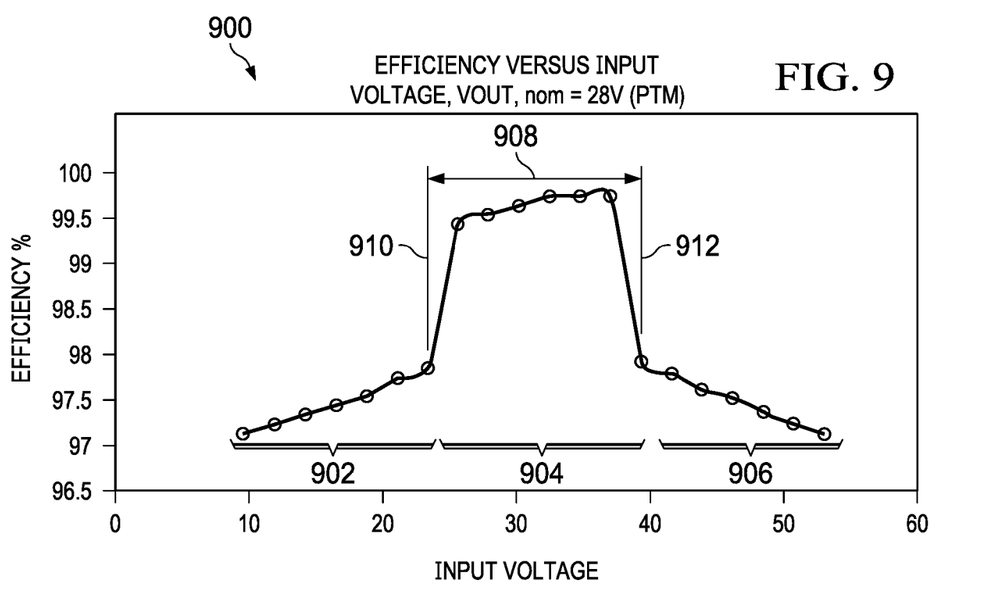
FIG. 9 is an exemplary waveform illustrating the input voltage versus the output voltage for the improved power converter in FIG. 8.

As the level of VIN 808 continues to rise past the upper boundary of the output voltage window, the controller 804 receives a voltage measurement from the buck voltage sensing circuit 806*b* indicating that a level of VOUT 810 is too high, which causes the controller 804 to begin switching switches S1 814 and S3 816 at an appropriate duty cycle, i.e., greater than 0% and less than 100%, to achieve the desired level of VOUT 810 commanded by the feedback from the buck voltage sensing circuit 806*b*, FIG. 9 is an exemplary waveform illustrating the input voltage versus the output voltage for the improved power converter incorporating a voltage-modulating circuit with pass-through mode in accordance with an illustrative embodiment. Waveform 900 is divided into three regions, namely boost region 902, transition region 904, and buck region 906, which corresponds to operation of the power converter in boost mode, transition mode, and buck mode, respectively. The output voltage window 908 is located between a first boundary 910 at about 24V and a second boundary 912 at about 39V, which coincides with the transition region 904.

Figure 10:
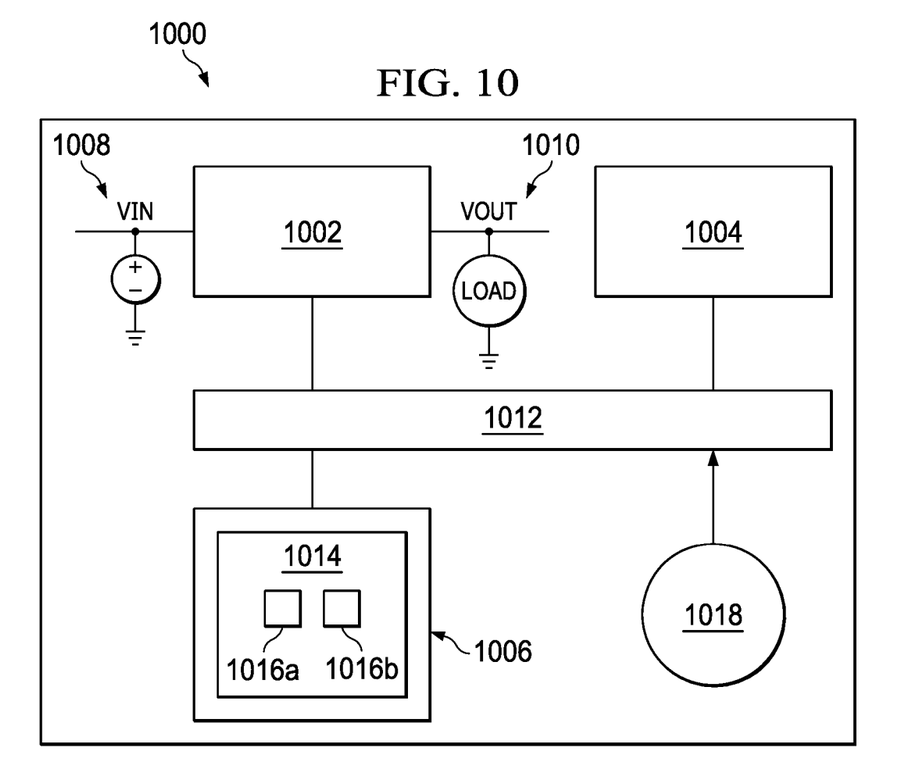
FIG. 10 is a schematic diagram of another improved power converter including a voltage-modulating circuit with a pass-through mode in accordance with another illustrative embodiment.

In a non-limiting embodiment, the first boundary 910 and the secondary boundary 912 are established by the adjustment pins 824 in FIG. 8, or by the voltage values stored in the set of registers 1016 in FIG. 10. As previously discussed, the increase in efficiency can be attributed to the lack of repeated switching while the voltage-modulating circuit 802 is operating in the pass-through mode.

While the embodiment described in FIG. 8 relates the analog programming of the first boundary 910 and the second boundary 912, digital programming can be used in one or more alternate embodiments. In particular, with appropriate modifications to the power converter 800, a conventional communication method and protocol, i.e., I2C and PMBus, can be used to define the boundaries of the output voltage window for pass-through mode operation. An exemplary power converter that can be programmed digitally is shown in the figure that follows.

FIG. 10 is a schematic diagram of another improved power converter including a voltage-modulating circuit with a pass-through mode in accordance with another illustrative embodiment. Power converter 1000 includes a voltage-modulating circuit 1002 connected to a controller 1004 and a sensing circuit 1006. The voltage-modulating circuit 1002 receives VIN 1008 and the controller 1004 controls the operation of the voltage-modulating circuit 1002 to provide VOUT 1010 at a level based on a voltage measurement provided by the sensing circuit 1006 and an operating mode. In one embodiment, the voltage-modulating circuit 1002, the controller 1004, and the sensing circuit 1006 are connected via a communications bus 1012 that allows the pass-through mode to be programmed digitally.

The voltage-modulating circuit 1002 is analogous to voltage-modulating circuit 802 in FIG. 8, and the controller 1004 is like controller 804 in FIG. 8. The sensing circuit 1006 can be implemented as an analog-to-digital converter (ADC) in some embodiments. The sensing circuit 1006 includes a set of externally programmable connectors 1014 that can be programmed digitally. For example, the set of externally programmable connectors 1014 can receive a first voltage value and a second voltage value via communication bus 1012 for storage in a first register 1016*a* and a second register 1016*b*, respectively. The first voltage value and the second voltage value can be used to determine the one or more boundaries of an output voltage window that corresponds to the pass-through mode of operation.

The operating mode of the voltage-modulating circuit 1002 is defined by a mode selection bit 1018 that can be obtained by the controller 1004 via the communications bus 1012.

Figure 11:
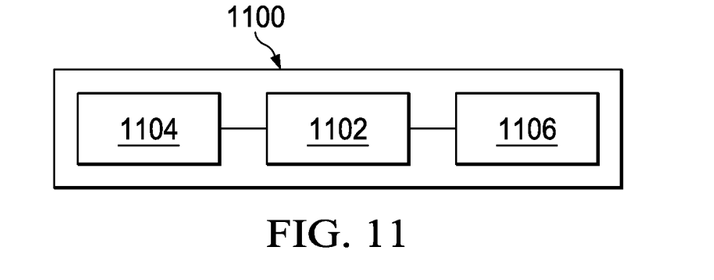
FIG. 11 is a simplified diagram of an apparatus implementing the improved power converter including a voltage-modulating circuit with a pass-through mode in accordance with an illustrative embodiment.

FIG. 11 is a simplified diagram of an apparatus implementing the improved power converter including a voltage-modulating circuit with a pass-through mode in accordance with an illustrative embodiment. Apparatus 1100 includes an improved power converter 1102 that is configured to receive power from a power supply 1104 and provide power to a current-drawing load 1106. In one embodiment, the power converter 1102 can be the improved power converter 800 described in FIG. 8 with adjustment pins 824 that accommodate analog programming. In another embodiment, the power converter 1102 can be the improved power converter 1000 described in FIG. 10 with adjustment pins 824 that can be programmed digitally. Non-limiting examples of the current-drawing load 1106 can include resistive loads or non-resistive loads consisting of load devices such as another power module or an LED bank.

Apparatus 1100 is a powered electronic device, examples of which include telecommunications devices, electric vehicles, medical devices, and computing devices. The power converter 1102 can be programmed by a customer with specific boundaries for an output voltage window that defines the voltages at which the improved power converter 1102 operates in pass-through mode. Alternatively, the power converter 1102 can be programmed by a customer to eliminate pass-through mode operation, as described in FIG. 8, so that the power converter 1102 can operate as a traditional buck-boost power converter.

Figure 12:
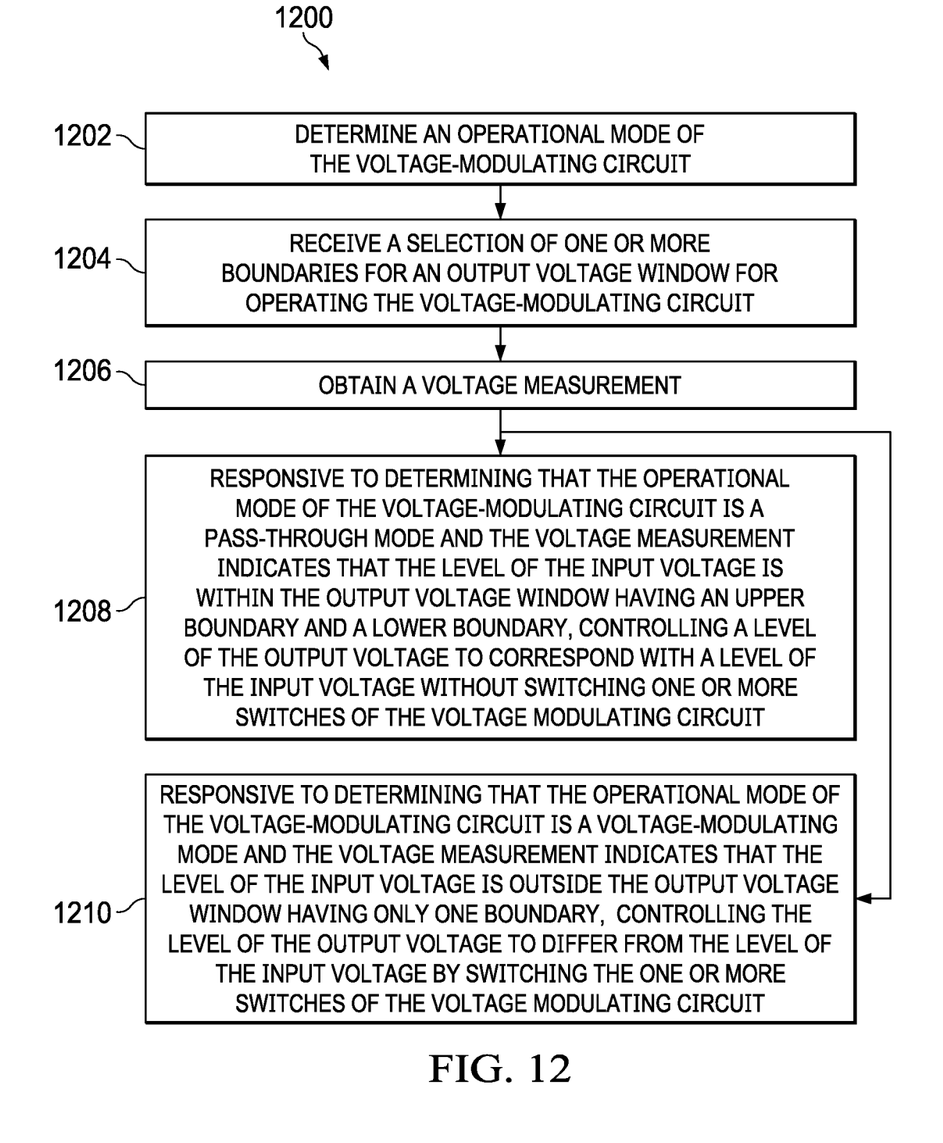
FIG. 12 is a flowchart of a process for operating an improved power converter with pass-through mode in accordance with an illustrative embodiment.

FIG. 12 is a flowchart of a process for operating an improved power converter with pass-through mode in accordance with an illustrative embodiment. The steps of flowchart 1200 can be implemented in an improved power converter including a power-modulating circuit with a pass-through mode of operation, such as voltage-modulating circuit 800 in FIG. 8 or voltage-modulating circuit 1000 in FIG. 10.

Flowchart 1200 begins at step 1202 by determining an operational mode of the voltage-modulating circuit. The operational mode of the voltage-modulating circuit can be determined by a controller. In an embodiment utilizing analog programming, the operational mode of the voltage-modulating circuit is determined to be the pass-through mode based on an absence of an electrical connection between the first adjustment pin and the second adjustment pin, and the operational mode of the voltage-modulating circuit is determined to be in the voltage-modulating mode based on a presence of the electrical connection between the first adjustment pin and the second adjustment pin. In an embodiment utilizing digital programming, the operational mode is determined to be in the pass-through mode based on a detection of a first value of a mode selection bit corresponding to the pass-through mode, and the operational mode is determined to be in the voltage-modulating mode based on a detection of a second value of the mode selection bit corresponding to the voltage-modulating mode.

In Step 1204 a selection of one or more boundaries for an output voltage window for operating the voltage-modulating circuit is received by one or more externally programmable connectors of the sensing circuit. In the embodiment utilizing analog programming, the one or more boundaries for the output voltage window is received by the first adjustment pin receiving a first resistor strap having a first resistance, and by the second adjustment pin receiving a second resistor strap having a second resistance that differs from the first resistance. In the embodiment utilizing digital programming, the power converter includes a communication bus configured to receive a first voltage value and a second voltage value that determine the one or more boundaries of the output voltage window, and the sensing circuit is an analog-to-digital converter, the selection of the one or more boundaries of the output voltage window includes storing the first voltage value in a first register of the set of externally programmable connectors and storing the second voltage value in a second register of the set of externally programmable connectors.

In Step 1206, the voltage measurement is obtained by the sensing circuit. In the embodiment that utilizes analog programming, the voltage measurement is obtained by measuring, with the boost voltage sensing circuit and the buck voltage sensing circuit, the output voltage. In the embodiment that utilizes digital programming, the voltage measurement is obtained by measuring, with an analog-to-digital converter, the output voltage.

Flowchart 1200 proceeds from Step 1206 to Step 1208 responsive to determining that the operational mode of the voltage-modulating circuit is a pass-through mode, and the voltage measurement indicates that a level of the input voltage is within the output voltage window having an upper boundary and a lower boundary, where a level of the output voltage is controlled to correspond with a level of the input voltage without switching the one or more switches.

Flowchart 1200 proceeds from Step 1206 to Step 1210 responsive to determining that the operational mode of the voltage-modulating circuit is a voltage-modulating mode, and the voltage measurement indicates that the level of the input voltage is outside the output voltage window having only one boundary, where a level of the output voltage is controlled to differ from the level of the input voltage by switching the one or more switches.

Additional Embodiments

The following descriptive embodiments are offered in further support of the disclosed invention:

In a first embodiment, novel aspects of the present disclosure are directed to an improved power converter comprising a voltage-modulating circuit that comprises one or more switches, the voltage-modulating circuit configured to receive an input voltage and provide an output voltage; a controller coupled to the voltage-modulating circuit, wherein the controller is configured to selectively drive the one or more switches to control a level of the output voltage based on the operational mode of the voltage-modulating circuit; and a sensing circuit connected to the voltage-modulating circuit and the controller, wherein the sensing circuit comprises one or more externally programmable connectors configured to determine one or more boundaries of an output voltage window for operating the voltage-modulating circuit, and wherein when the operational mode of the voltage-modulating circuit is a pass-through mode and a voltage measurement indicates that a level of the input voltage is within the output voltage window having an upper boundary and a lower boundary, the voltage-modulating circuit is configured to control the level of the output voltage to correspond with the level of the input voltage without switching the one or more switches, and wherein when the operational mode of the voltage-modulating circuit is in a voltage-modulating mode and the voltage measurement indicates that the level of the input voltage is outside of the output voltage window having only one boundary, the voltage-modulating circuit is configured to control the level of the output voltage to differ from the level of the input voltage by switching the one or more switches.

In another aspect of the first embodiment, the improved power converter comprises a voltage-modulating circuit that comprises one or more switches, the voltage-modulating circuit configured to receive an input voltage and provide an output voltage; a controller coupled to the voltage-modulating circuit, wherein the controller is configured to selectively drive the one or more switches to control a level of the output voltage based on the operational mode of the voltage-modulating circuit; and a sensing circuit connected to the voltage-modulating circuit and the controller, wherein the sensing circuit comprises one or more externally programmable connectors configured to determine one or more boundaries of an output voltage window for operating the voltage-modulating circuit, and wherein when the operational mode of the voltage-modulating circuit is a pass-through mode and a voltage measurement indicates that a level of the input voltage is within the output voltage window having an upper boundary and a lower boundary, the voltage-modulating circuit is configured to control the level of the output voltage to correspond with the level of the input voltage without switching the one or more switches, and wherein when the operational mode of the voltage-modulating circuit is in a voltage-modulating mode and the voltage measurement indicates that the level of the input voltage is outside of the output voltage window having only one boundary, the voltage-modulating circuit is configured to control the level of the output voltage to differ from the level of the input voltage by switching the one or more switches; and wherein the power converter further comprises one or more limitations selected from the following list:

wherein the voltage-modulating circuit further comprises a boost circuit that comprises a first pair of switches and a buck circuit that comprises a second pair of switches connected to the first pair of switches by a shared inductor;

wherein the sensing circuit comprises a boost voltage sensing circuit configured to detect the output voltage; and a buck voltage sensing circuit configured to detect the output voltage, wherein the set of externally programmable connectors comprises a first adjustment pin connected to the boost voltage sensing circuit and a second adjustment pin connected to the buck voltage sensing circuit;

the first adjustment pin is configured to receive a first resistor strap having a first resistance, and the second adjustment pin is configured to receive a second resistor strap having a second resistance that differs from the first resistance;

wherein the operational mode of the voltage-modulating circuit is in the pass-through mode based on an absence of an electrical connection between the first adjustment pin and the second adjustment pin, and wherein the operational mode of the voltage-modulating circuit is in the voltage-modulating mode based on a presence of the electrical connection between the first adjustment pin and the second adjustment pin;

wherein the sensing circuit is an analog-to-digital converter, and wherein the power converter further comprises: a communication bus configured to receive a first voltage value and a second voltage value, wherein: the set of externally programmable connectors includes a first register and a second register, the first register is configured to store the first voltage value and the second register is configured to store the second voltage value, and the first voltage value and the second voltage value determine the one or more boundaries of the output voltage window; and when the operational mode of the voltage-modulating circuit is the pass-through mode, the upper boundary is determined by the first voltage value and the lower boundary is determined by the second voltage value, and when the operational mode of the voltage-modulating circuit is the voltage-modulating mode and the first register and the second register are used for storing the first voltage value and the second voltage value, respectively, the first voltage value and the second voltage value are the same.

In a second embodiment, novel aspects of the present disclosure are directed to an apparatus comprising a power converter that includes a current-drawing load configured to receive an output voltage; and a power converter connected to the current-drawing load, wherein the power converter comprises: a voltage-modulating circuit that comprises one or more switches, the voltage-modulating circuit configured to receive an input voltage and provide the output voltage; a controller coupled to the voltage-modulating circuit, wherein the controller is configured to selectively drive the one or more switches to control a level of the output voltage based on the operational mode of the voltage-modulating circuit; and a sensing circuit connected to the voltage-modulating circuit and the controller, wherein the sensing circuit comprises one or more externally programmable connectors configured to determine one or more boundaries of an output voltage window for operating the voltage-modulating circuit, and wherein when the operational mode of the voltage-modulating circuit is a pass-through mode and a voltage measurement indicates that a level of the input voltage is within the output voltage window having an upper boundary and a lower boundary, the voltage-modulating circuit is configured to control the level of the output voltage to correspond with the level of the input voltage without switching the one or more switches, and wherein when the operational mode of the voltage-modulating circuit is in a voltage-modulating mode and the voltage measurement indicates that the level of the input voltage is outside of the output voltage window having only one boundary, the voltage-modulating circuit is configured to control the level of the output voltage to differ from the level of the input voltage by switching the one or more switches.

In another aspect of the second embodiment, the apparatus comprises a power converter that includes a current-drawing load configured to receive an output voltage; and a power converter connected to the current-drawing load, wherein the power converter comprises: a voltage-modulating circuit that comprises one or more switches, the voltage-modulating circuit configured to receive an input voltage and provide the output voltage; a controller coupled to the voltage-modulating circuit, wherein the controller is configured to selectively drive the one or more switches to control a level of the output voltage based on the operational mode of the voltage-modulating circuit; and a sensing circuit connected to the voltage-modulating circuit and the controller, wherein the sensing circuit comprises one or more externally programmable connectors configured to determine one or more boundaries of an output voltage window for operating the voltage-modulating circuit, and wherein when the operational mode of the voltage-modulating circuit is a pass-through mode and a voltage measurement indicates that a level of the input voltage is within the output voltage window having an upper boundary and a lower boundary, the voltage-modulating circuit is configured to control the level of the output voltage to correspond with the level of the input voltage without switching the one or more switches, and wherein when the operational mode of the voltage-modulating circuit is in a voltage-modulating mode and the voltage measurement indicates that the level of the input voltage is outside of the output voltage window having only one boundary, the voltage-modulating circuit is configured to control the level of the output voltage to differ from the level of the input voltage by switching the one or more switches; and wherein the apparatus further comprises one or more limitations selected from the following list:

wherein the voltage-modulating circuit further comprises a boost circuit that comprises a first pair of switches and a buck circuit that comprises a second pair of switches connected to the first pair of switches by a shared inductor;

wherein the sensing circuit comprises: a boost voltage sensing circuit configured to detect the output voltage; and a buck voltage sensing circuit configured to detect the output voltage, wherein the set of externally programmable connectors comprises a first adjustment pin connected to the boost voltage sensing circuit and a second adjustment pin connected to the buck voltage sensing circuit;

wherein the first adjustment pin is configured to receive a first resistor strap having a first resistance, and the second adjustment pin is configured to receive a second resistor strap having a second resistance that differs from the first resistance;

wherein the operational mode of the voltage-modulating circuit is in the pass-through mode based on an absence of an electrical connection between the first adjustment pin and the second adjustment pin, and wherein the operational mode of the voltage-modulating circuit is in the voltage-modulating mode based on a presence of the electrical connection between the first adjustment pin and the second adjustment pin;

wherein the sensing circuit is an analog-to-digital converter, and wherein the power converter further comprises a communication bus configured to receive a first voltage value and a second voltage value, wherein: the set of externally programmable connectors includes a first register and a second register, the first register is configured to store the first voltage value and the second register is configured to store the second voltage value, and the first voltage value and the second voltage value determine the one or more boundaries of the output voltage window; and wherein when the operational mode of the voltage-modulating circuit is the pass-through mode, the upper boundary is determined by the first voltage value and the lower boundary is determined by the second voltage value, and when the operational mode of the voltage-modulating circuit is the voltage-modulating mode and the first register and the second register are used for storing the first voltage value and the second voltage value, respectively, the first voltage value and the second voltage value are the same.

In a third embodiment, novel aspects of the present disclosure are directed to a method for operating a power converter that comprises a voltage-modulating circuit configured to receive an input voltage and provide an output voltage, a sensing circuit configured to measure a voltage of the voltage-modulating circuit, and a controller configured to selectively drive one or more switches of the voltage-modulating circuit based on the voltage measurement, the method comprising determining, by the controller, an operational mode of the voltage-modulating circuit; receiving, by one or more externally programmable connectors of the sensing circuit, a selection of one or more boundaries for an output voltage window for operating the voltage-modulating circuit; obtaining, with the sensing circuit, the voltage measurement; responsive to determining that the operational mode of the voltage-modulating circuit is a pass-through mode and the voltage measurement indicates that a level of the input voltage is within the output voltage window having an upper boundary and a lower boundary, controlling, with the controller, a level of the output voltage to correspond with a level of the input voltage without switching the one or more switches; and responsive to determining that the operational mode of the voltage-modulating circuit is a voltage-modulating mode and the voltage measurement indicates that the level of the input voltage is outside the output voltage window having only one boundary, controlling, with the controller, the level of the output voltage to differ from the level of the input voltage by switching the one or more switches.

In another aspect of the third embodiment, the method for operating a power converter that comprises a voltage-modulating circuit configured to receive an input voltage and provide an output voltage, a sensing circuit configured to measure a voltage of the voltage-modulating circuit, and a controller configured to selectively drive one or more switches of the voltage-modulating circuit based on the voltage measurement, the method comprising determining, by the controller, an operational mode of the voltage-modulating circuit; receiving, by one or more externally programmable connectors of the sensing circuit, a selection of one or more boundaries for an output voltage window for operating the voltage-modulating circuit; obtaining, with the sensing circuit, the voltage measurement; responsive to determining that the operational mode of the voltage-modulating circuit is a pass-through mode and the voltage measurement indicates that a level of the input voltage is within the output voltage window having an upper boundary and a lower boundary, controlling, with the controller, a level of the output voltage to correspond with a level of the input voltage without switching the one or more switches; and responsive to determining that the operational mode of the voltage-modulating circuit is a voltage-modulating mode and the voltage measurement indicates that the level of the input voltage is outside the output voltage window having only one boundary, controlling, with the controller, the level of the output voltage to differ from the level of the input voltage by switching the one or more switches; and wherein the method further comprises one or more limitations selected from the following list:

wherein the sensing circuit comprises a boost voltage sensing circuit and a buck voltage sensing circuit, wherein the set of externally programmable connectors comprises a first adjustment pin connected to the boost voltage sensing circuit and a second adjustment pin connected to the buck voltage sensing circuit, and wherein the step of obtaining the voltage measurement further comprises: measuring, with the boost voltage sensing circuit and the buck voltage sensing circuit, the output voltage;

wherein receiving the selection of the one or more boundaries for the output voltage window for operating the voltage-modulating circuit further comprises receiving, by the first adjustment pin, a first resistor strap having a first resistance, and receiving, by the second adjustment pin, a second resistor strap having a second resistance that differs from the first resistance;

wherein determining the operational mode of the voltage-modulating circuit further comprises determining the operational mode of the voltage-modulating circuit is in the pass-through mode based on an absence of an electrical connection between the first adjustment pin and the second adjustment pin, and determining the operational mode of the voltage-modulating circuit is in the voltage-modulating mode based on a presence of the electrical connection between the first adjustment pin and the second adjustment pin;

wherein the power converter further comprises a communication bus configured to receive a first voltage value and a second voltage value that determine the one or more boundaries of the output voltage window, wherein the sensing circuit is an analog-to-digital converter, and wherein receiving the selection of the one or more boundaries of the output voltage window further comprises storing the first voltage value in a first register of the set of externally programmable connectors; and storing the second voltage value in a second register of the set of externally programmable connectors; and wherein determining the operational mode is the pass-through mode further comprises detecting a first value of a mode selection bit corresponding to the pass-through mode, and determining the operational mode is the voltage-modulating mode further comprises detecting a second value of the mode selection bit corresponding to the voltage-modulating mode.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments.

Additionally, where an embodiment is described herein as comprising some element or group of elements, additional embodiments can consist essentially of or consist of the element or group of elements. Also, although the open-ended term "comprises" is generally used herein, additional embodiments can be formed by substituting the terms "consisting essentially of" or "consisting of."

While this invention has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. For example, the exemplary power converters depicted and described in this disclosure are based on a particular configuration of non-isolated buck-boost converters, but skilled artisans would be able to apply these teachings to any non-isolated topology where the input and output can be connected by activating one or more switches. Additionally, these teachings could be implemented in one or more hybrid buck converters and other available step-up and step-down power converter topologies. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A power converter comprising:
   a voltage-modulating circuit that comprises one or more switches, the voltage-modulating circuit configured to receive an input voltage and provide an output voltage;
   a controller coupled to the voltage-modulating circuit, wherein the controller is configured to selectively drive the one or more switches to control a level of the output voltage based on an operational mode of the voltage-modulating circuit; and
   a sensing circuit connected to the voltage-modulating circuit and the controller, wherein the sensing circuit comprises one or more externally programmable connectors configured to engage a removable circuit element to change one or more boundaries of an output voltage window for operating the voltage-modulating circuit and to select the operational mode of the voltage-modulating circuit, and wherein:
      when the operational mode of the voltage-modulating circuit is a pass-through mode and a voltage measurement indicates that a level of the input voltage is within the output voltage window having an upper boundary and a lower boundary, the voltage-modulating circuit is configured to control the level of the output voltage to correspond with the level of the input voltage without switching the one or more switches, and
      when the operational mode of the voltage-modulating circuit is in a voltage-modulating mode and the voltage measurement indicates that the level of the input voltage is outside of the output voltage window, the voltage-modulating circuit is configured to control the level of the output voltage to differ from the level of the input voltage by switching the one or more switches.

2. The power converter of claim 1, wherein the voltage-modulating circuit further comprises a boost circuit that comprises a first pair of switches and a buck circuit that comprises a second pair of switches connected to the first pair of switches by a shared inductor.

3. The power converter of claim 1, wherein the sensing circuit comprises:
   a boost voltage sensing circuit configured to detect the output voltage; and
   a buck voltage sensing circuit configured to detect the output voltage,
   wherein the set of externally programmable connectors comprises a first adjustment pin connected to the boost voltage sensing circuit and a second adjustment pin connected to the buck voltage sensing circuit.

4. The power converter of claim 3, wherein:
   the first adjustment pin is configured to receive a first resistor strap having a first resistance, and
   the second adjustment pin is configured to receive a second resistor strap having a second resistance that differs from the first resistance.

5. The power converter of claim 3, wherein the operational mode of the voltage-modulating circuit is in the pass-through mode based on an absence of the removable circuit element providing an electrical connection between the first adjustment pin and the second adjustment pin, and wherein the operational mode of the voltage-modulating circuit is in the voltage-modulating mode based on a presence of the removable circuit element providing the electrical connection between the first adjustment pin and the second adjustment pin.

6. The power converter of claim 1, wherein the sensing circuit is an analog-to-digital converter, and wherein the power converter further comprises:
   a communication bus configured to be coupled to the removable circuit element that provides a first voltage value and a second voltage value, wherein:
   the set of externally programmable connectors includes a first register and a second register,
   the first register is configured to store the first voltage value and the second register is configured to store the second voltage value, and
   the first voltage value and the second voltage value change the one or more boundaries of the output voltage window.

7. The power converter of claim 6, wherein:
   when the operational mode of the voltage-modulating circuit is the pass-through mode, the upper boundary is determined by the first voltage value and the lower boundary is determined by the second voltage value, and
   when the operational mode of the voltage-modulating circuit is the voltage-modulating mode and the first register and the second register are used for storing the first voltage value and the second voltage value, respectively, the first voltage value and the second voltage value are the same.

8. An apparatus comprising:
   a current-drawing load configured to receive an output voltage; and
   a power converter connected to the current-drawing load, wherein the power converter comprises:
      a voltage-modulating circuit that comprises one or more switches, the voltage-modulating circuit configured to receive an input voltage and provide the output voltage;
      a controller coupled to the voltage-modulating circuit, wherein the controller is configured to selectively drive the one or more switches to control a level of the output voltage based on an operational mode of the voltage-modulating circuit; and
      a sensing circuit connected to the voltage-modulating circuit and the controller, wherein the sensing circuit comprises one or more externally programmable connectors configured to engage a removable circuit element to change one or more boundaries of an output voltage window for operating the voltage-modulating circuit and to select the operational mode of the voltage-modulating circuit, and wherein:

when the operational mode of the voltage-modulating circuit is a pass-through mode and a voltage measurement indicates that a level of the input voltage is within the output voltage window having an upper boundary and a lower boundary, the voltage-modulating circuit is configured to control the level of the output voltage to correspond with the level of the input voltage without switching the one or more switches, and when the operational mode of the voltage-modulating circuit is in a voltage-modulating mode and the voltage measurement indicates that the level of the input voltage is outside of the output voltage window, the voltage-modulating circuit is configured to control the level of the output voltage to differ from the level of the input voltage by switching the one or more switches.

9. The apparatus of claim 8, wherein the voltage-modulating circuit further comprises a boost circuit that comprises a first pair of switches and a buck circuit that comprises a second pair of switches connected to the first pair of switches by a shared inductor.

10. The apparatus of claim 8, wherein the sensing circuit comprises:
a boost voltage sensing circuit configured to detect the output voltage; and
a buck voltage sensing circuit configured to detect the output voltage,
wherein the set of externally programmable connectors comprises a first adjustment pin connected to the boost voltage sensing circuit and a second adjustment pin connected to the buck voltage sensing circuit.

11. The apparatus of claim 10, wherein:
the first adjustment pin is configured to receive a first resistor strap having a first resistance, and
the second adjustment pin is configured to receive a second resistor strap having a second resistance that differs from the first resistance.

12. The apparatus of claim 10, wherein the operational mode of the voltage-modulating circuit is in the pass-through mode based on an absence of the removable circuit element providing an electrical connection between the first adjustment pin and the second adjustment pin, and wherein the operational mode of the voltage-modulating circuit is in the voltage-modulating mode based on a presence of the removable circuit element providing the electrical connection between the first adjustment pin and the second adjustment pin.

13. The apparatus of claim 8, wherein the sensing circuit is an analog-to-digital converter, and wherein the power converter further comprises:
a communication bus configured to coupled with the removable circuit element providing a first voltage value and a second voltage value, wherein:
the set of externally programmable connectors that engages the removable circuit element through the communication bus, wherein the set of externally programmable connectors is coupled to a first register and a second register,
the first register is configured to store the first voltage value and the second register is configured to store the second voltage value, and the first voltage value and the second voltage value determine the one or more boundaries of the output voltage window.

14. The apparatus of claim 13, wherein:
when the operational mode of the voltage-modulating circuit is the pass-through mode based on a first value of a mode selection bit, the upper boundary is determined by the first voltage value and the lower boundary is determined by the second voltage value, and
when the operational mode of the voltage-modulating circuit is the voltage-modulating mode based on a second value of the mode selection bit and the first register and the second register are used for storing the first voltage value and the second voltage value, respectively, the first voltage value and the second voltage value are the same.

15. A method for operating a power converter that comprises a voltage-modulating circuit configured to receive an input voltage and provide an output voltage, a sensing circuit configured to measure a voltage of the voltage-modulating circuit, and a controller configured to selectively drive one or more switches of the voltage-modulating circuit based on the voltage measurement, the method comprising:
changing, by the controller, an operational mode of the voltage-modulating circuit based on a removable circuit element engaged with one or more externally programmable connectors indicating the operational mode of the voltage-modulating circuit;
receiving, by the one or more externally programmable connectors of the sensing circuit, a selection of one or more boundaries for an output voltage window for operating the voltage-modulating circuit;
obtaining, with the sensing circuit, the voltage measurement;
responsive to determining that the operational mode of the voltage-modulating circuit is a pass-through mode and the voltage measurement indicates that a level of the input voltage is within the output voltage window having an upper boundary and a lower boundary, controlling, with the controller, a level of the output voltage to correspond with a level of the input voltage without switching the one or more switches; and
responsive to determining that the operational mode of the voltage-modulating circuit is a voltage-modulating mode and the voltage measurement indicates that the level of the input voltage is outside the output voltage window, controlling, with the controller, the level of the output voltage to differ from the level of the input voltage by switching the one or more switches.

16. The method of claim 15, wherein the sensing circuit comprises a boost voltage sensing circuit and a buck voltage sensing circuit, wherein the set of externally programmable connectors comprises a first adjustment pin connected to the boost voltage sensing circuit and a second adjustment pin connected to the buck voltage sensing circuit, and wherein the step of obtaining the voltage measurement further comprises:
measuring, with the boost voltage sensing circuit and the buck voltage sensing circuit, the output voltage.

17. The method of claim 16, wherein receiving the selection of the one or more boundaries for the output voltage window for operating the voltage-modulating circuit further comprises:
receiving, by the first adjustment pin, a first resistor strap having a first resistance, and receiving, by the second adjustment pin, a second resistor strap having a second resistance that differs from the first resistance.

18. The method of claim 16, wherein determining the operational mode of the voltage-modulating circuit further comprises:
   determining the operational mode of the voltage-modulating circuit is in the pass-through mode based on an absence of the removable circuit element providing an electrical connection between the first adjustment pin and the second adjustment pin, and
   determining the operational mode of the voltage-modulating circuit is in the voltage-modulating mode based on a presence of the removable circuit element providing the electrical connection between the first adjustment pin and the second adjustment pin.

19. The method of claim 15, wherein the power converter further comprises a communication bus configured to be coupled with the removable circuit element that provides a first voltage value and a second voltage value that determine the one or more boundaries of the output voltage window, wherein the set of externally programmable connectors engages with the removable circuit element through the communication bus, wherein the sensing circuit is an analog-to-digital converter, and wherein receiving the selection of the one or more boundaries of the output voltage window further comprises:
   storing the first voltage value in a first register of the set of externally programmable connectors; and
   storing the second voltage value in a second register of the set of externally programmable connectors.

20. The method of claim 19, wherein:
   determining the operational mode is the pass-through mode further comprises detecting a first value of a mode selection bit corresponding to the pass-through mode, and
   determining the operational mode is the voltage-modulating mode further comprises detecting a second value of the mode selection bit corresponding to the voltage-modulating mode.

* * * * *